United States Patent [19]
Stoytchev et al.

[11] 3,710,967
[45] Jan. 16, 1973

[54] ASSEMBLY FOR LATERAL SHIFTING OF THE LOAD SUPPORT OF A HIGH LIFT TRUCK

[75] Inventors: Stoytcho Grigorov Stoytchev; Gueorgui Kirilov Stoilov; Tsani Konstantinov Tsanev; Zdravko Marinov Gueorguiev; Gueorgui Yordanov Stoyanov, all of Sofia, Bulgaria

[73] Assignee: DSO Balkancar, Sofia, Bulgaria

[22] Filed: June 16, 1969

[21] Appl. No.: 833,283

[52] U.S. Cl..................................................214/674
[51] Int. Cl...............................................B66f 9/10
[58] Field of Search.....................214/660, 670–674, 214/730

[56] References Cited

UNITED STATES PATENTS

| 3,472,408 | 10/1969 | Hendricks et al. | 214/674 |
| 3,490,633 | 1/1970 | Avis et al. | 214/672 |
| 3,515,301 | 6/1970 | Emke | 214/670 X |

FOREIGN PATENTS OR APPLICATIONS

| 1,080,177 | 12/1954 | France | 214/674 |
| 1,431,502 | 12/1968 | Germany | 214/672 |
| 946,691 | 1/1964 | Great Britain | 214/672 |
| 182,497 | 2/1963 | Sweden | 214/671 |
| 190,438 | 7/1964 | Sweden | 214/671 |

*Primary Examiner*—Robert G. Sheridan
*Assistant Examiner*—R. Johnson
*Attorney*—Karl F. Ross

[57] ABSTRACT

A load-supporting carriage of a lift truck is vertically slidable on a mast mounted for lateral shifting and forward or rearward tilting on a pair of parallel horizontal rods, extending transversely to the truck frame, by means of a pair of sleeves riding on these rods. The upper rod is rigid with the frame while the corresponding sleeve is secured to a hydraulic jack for lateral shifting; the lower rod is mounted between the arms of a yoke which is secured to another jack for the tilting of the mast and whose sides are provided with adjustable end stops in the form of threaded retaining cups with spring-loaded balls projecting therefrom into engagement with associated guide tracks on the lateral walls of the truck frame.

4 Claims, 1 Drawing Figure

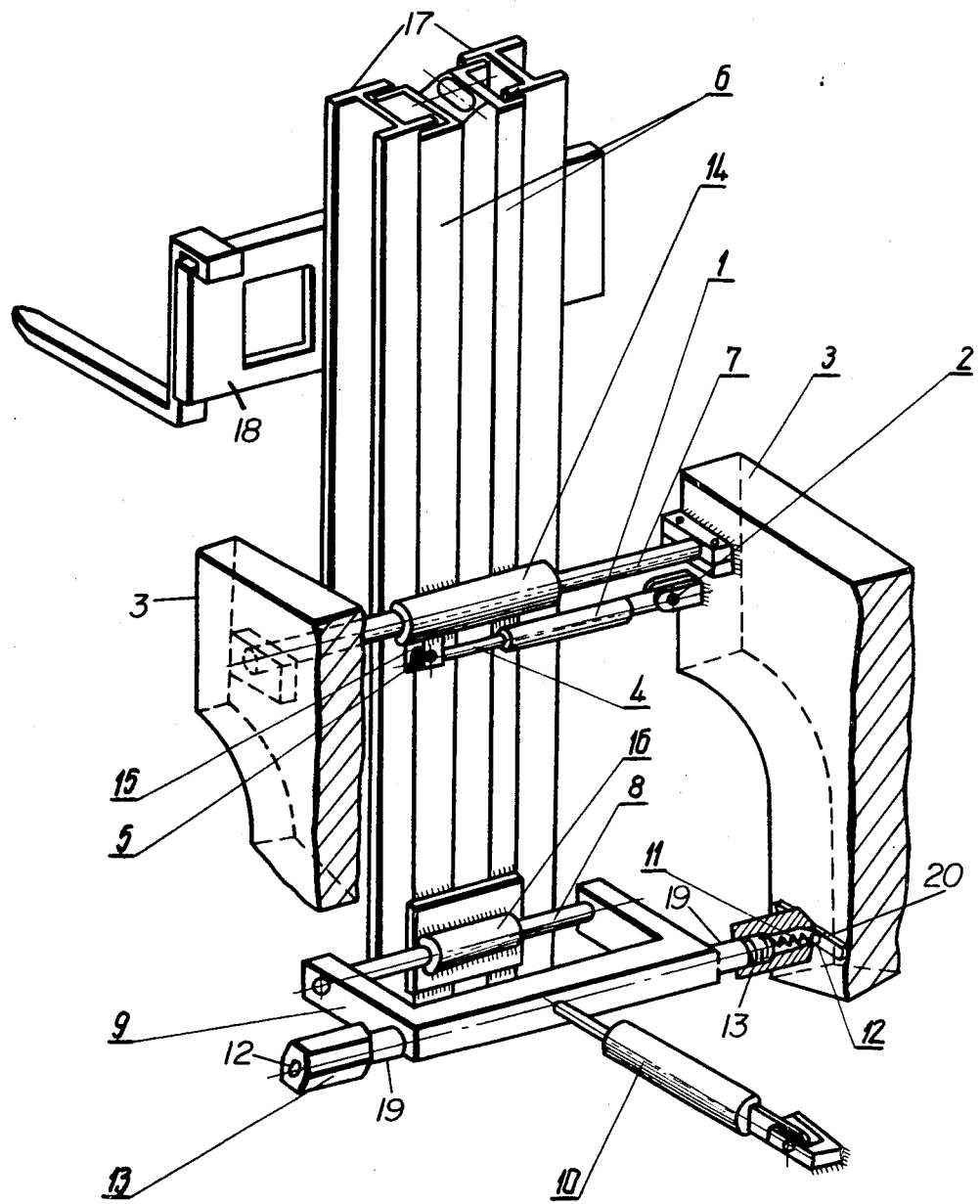

ASSEMBLY FOR LATERAL SHIFTING OF THE LOAD SUPPORT OF A HIGH LIFT TRUCK

This invention relates to an assembly for enabling substantial lateral shifting of the load support of a high-lift truck in combination with a forward or backward tilt thereof by a large angle. Such an arrangement makes it possible to take up and deposit loads asymmetrically positioned with reference to the longitudinal axis of the lift truck, as well as to handle loads close to a wall along truck is moving, as is the case with loading/unloading operations in railroad cars, ship holds etc.

We are aware of several assemblies for front-loading high lift trucks designed for shifting the load laterally in regard to the longitudinal axis of the truck. With certain of those prior devices, such as the so-called fork equalizer, the shifting of the load is achieved by shifting the fork holder or carriage of the load support. This type of assembly, has the following flaws:

It increases the distance from the driving axle to the fork heel, and thereby also the tilting moment which act upon the truck, leading thus to an increase of the truck's overall dimensions, its weight, its power supply and accordingly also its power expenditure;

It requires the installation of a supplementary coupling comprising a drum fitted to the load support for guiding the rubber oil pipes and connecting elements;

It reduces the number of interchangeable attachments available for use with the electric high-lift truck.

The object of our invention is to avoid the aforementioned drawbacks in a lift truck of the general type set forth.

This object is realized, pursuant to our invention, by the provision of a pair of horizontal rods extending transversely across the truck frame, the upper one of these rods being fixedly secured to the frame while the lower one spans the arms of a movable yolk. A pair of sleeves, rigid with a mast engaged by an elevatable load-supporting carriage, are traversed by these rods so as to be laterally shiftable, together with the mast and the carriage, under the control of a first hydraulic jack anchored to the frame and the upper sleeve. Tilting of the mast, in a plane perpendicular to the two rods, is possible under the control of a second hydraulic jack (or possibly a pair of such jacks) connected to the frame and to the yoke. In order to absorb unsymmetrical load stresses exerted upon the yoke and therefore upon the tilting jack or jacks when the mast and carriage are displaced from their center position, we provide the sides of the yoke with lateral stops in the form of spring-loaded balls bearing upon adjacent wall portions of the truck frame which are provided with means for guiding these balls during a swinging of the mast.

The invention will be described in greater detail hereinafter with reference to the accompanying drawing the sole FIGURE of which is a fragmentary perspective view of a lift truck embodying our present improvement.

As shown in the drawing, the frame or body of a lift truck forms two confronting sidewalls 3 spanned by a rod 7 fixedly secured thereto. A sleeve 14, traversed by that rod, is horizontally shiftable thereon together with a mast 6 engaged by a conventional carriage 17 forming a load-support 18. The shifting of the carriage is controlled by a hydraulic jack 1 which is connected to one of the wall portions 3 by a ball joint 2 and to sleeve 14 by another joint 5 and a bifurcate lug 15. The lower end of mast 6 is rigid with a second sleeve 16 sliding on a rod 8 parallel to rod 7, this rod 8 being supported by a yoke 9 attached to the piston of another hydraulic jack 10.

A pair of studs 19, projecting sideways from yoke 9, have retaining cups 13 adjustably threaded thereon, each cup being provided with an apertured end through which a ball 12 projects under pressure of a spring 11 toward the adjoining wall 3. A guide track 20 on that wall engages the projecting part of ball 12 to resist the stresses tending to swing the yoke 9 about the axis of jack 10 whenever the bar 8 is unsymmetrically loaded.

The two jacks, 1, 10 are of the double-acting type so that mast 6 may be shifted to the right or the left by the admission of oil to the corresponding end of the cylinder of jack 1 while a forward or backward tilting of the mast may be similarly affected by the admission of oil to the cylinder of jack 10. During the latter operation, the balls 12 roll in their respective guide tracks 20.

What we claim is:

1. In a lift truck provided with a frame, a tiltable and laterally shiftable mast on said frame, and a load-supporting carriage vertically slidable on said mast, the improvement which comprises an upper rod extending horizontally across said frame and fixedly secured thereto; a first sleeve slidable on said upper rod and rigid with said mast; a lower rod extending parallel to said upper rod; a second sleeve slidable on said lower rod and rigid with said mast; a yoke engaging the ends of said lower rod; first fluid-actuated jack means connected to said frame and said first sleeve for laterally shifting said mast; second fluid-actuated jack means connected to said frame and said yoke for tilting said mast in a plane perpendicular to said rods; and a pair of lateral stops on said yoke bearing upon adjacent wall portions of said frame, said stops each comprising a spring-loaded ball guided on a respective wall portion for absorbing unsymmetrical loading stresses exerted on said yoke by said mast upon a shifting thereof from a central position.

2. The improvement defined in claim 1 wherein each of said stops further comprises a retaining cup enclosing said spring-loaded ball and having an apertured end for enabling said ball to project therefrom into engagement with the respective wall portion.

3. The improvement defined in claim 2 wherein each of said stops further comprises a threaded stud adjustably engaged by said retaining cup.

4. The improvement defined in claim 2 wherein said first jack means is provided with a ball joint securing same to said frame.

* * * * *